US010205341B2

(12) United States Patent
Lai

(10) Patent No.: US 10,205,341 B2
(45) Date of Patent: Feb. 12, 2019

(54) DIRECT CURRENT BACKUP SYSTEM

(71) Applicants: LITE-ON ELECTRONICS (GUANGZHOU) LIMITED, Guangzhou (CN); LITE-ON TECHNOLOGY CORP., Taipei (TW)

(72) Inventor: Wei-Lieh Lai, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 329 days.

(21) Appl. No.: 15/059,532

(22) Filed: Mar. 3, 2016

(65) Prior Publication Data

US 2017/0093206 A1 Mar. 30, 2017

(30) Foreign Application Priority Data

Sep. 30, 2015 (CN) .......................... 2015 1 0646432

(51) Int. Cl.

| | |
|---|---|
| ***G06F 1/00*** | (2006.01) |
| ***H02J 7/00*** | (2006.01) |
| ***H02M 7/06*** | (2006.01) |
| ***G06F 1/28*** | (2006.01) |
| ***G06F 1/26*** | (2006.01) |
| ***H01M 10/42*** | (2006.01) |
| ***H01M 10/46*** | (2006.01) |
| ***H02J 9/06*** | (2006.01) |
| ***G06F 1/30*** | (2006.01) |

(52) U.S. Cl.
CPC .............. *H02J 9/061* (2013.01); *G06F 1/263* (2013.01); *G06F 1/30* (2013.01); *H02J 7/0068* (2013.01); *H02J 9/062* (2013.01)

(58) Field of Classification Search
CPC .......... H02J 9/061; H02J 7/0068; H02J 9/062; H02J 7/00; G06F 1/263; G06F 1/30
USPC ...................................................... 307/43–87
See application file for complete search history.

(56) References Cited

U.S. PATENT DOCUMENTS

| | | | | |
|---|---|---|---|---|
| 9,047,076 B1 * | 6/2015 | Lee | G06F 1/263 |
| 9,441,625 B2 * | 9/2016 | Schoendorff | F04B 51/00 |
| 9,552,031 B2 * | 1/2017 | Sarti | G06F 1/30 |
| 9,772,666 B1 * | 9/2017 | Kam | G06F 1/28 |
| 2008/0278006 A1 * | 11/2008 | Gottlieb | G01R 31/3648 307/66 |
| 2013/0154365 A1 * | 6/2013 | Sarti | H02M 7/06 307/23 |
| 2015/0380968 A1 * | 12/2015 | Lee | H02J 9/061 713/300 |
| 2017/0199246 A1 * | 7/2017 | Hindle | G01R 31/3631 |

* cited by examiner

*Primary Examiner* — Brandon S Cole
(74) *Attorney, Agent, or Firm* — Rosenberg, Klein & Lee

(57) ABSTRACT

A DC backup system is for providing emergency electric power to an electronic device powered by an input power source, and includes a battery backup unit and a battery control unit. The battery backup unit is operable to output state information indicating a state thereof, and test information associated with a self test performed thereon. The battery control unit is electrically connected to the battery backup unit for receiving the state information and the test information therefrom, and is configured to control, according to the state information and the test information, the battery backup unit to output electric power to the electronic device when the input power source fails.

15 Claims, 3 Drawing Sheets

DIRECT CURRENT BACKUP SYSTEM

CROSS-REFERENCE TO RELATED APPLICATION

This application claims priority of Chinese Application No. 201510646432.4, filed on Sep. 30, 2015.

FIELD

The disclosure relates to an electrical backup system, and more particularly to a direct current backup system.

BACKGROUND

Referring to FIG. 1, a conventional electricity architecture includes at least one alternating current (AC) transformer (e.g., two AC transformers 91, 92), at least one generator (e.g., two generators 93, 94), at least one uninterruptible power system (UPS) (e.g., two UPS's 95, 96), a power distribution unit (PDU) 97, an AC power shelf 98, a direct current (DC) bus 99, and a plurality of electronic devices (such as two servers 991, 992 and two storage devices 993, 994). The AC transformer 91, the generator 93 and the UPS 95 are electrically connected to the PDU 97 through a transmission line 10, and similarly, the AC transformer 92, the generator 94 and the UPS 96 are electrically connected to the PDU 97 through another transmission line 20. The PDU 97 is configured to distribute electric power from one of the transmission lines 10, 20 to the AC power shelf 98 such that the servers 991, 992 and the storage devices 993, 994 are powered by the electric power via the AC power shelf 98.

Each of the AC transformers 91, 92 is configured to receive electricity from a power plant or a front-end transformer, and to step down voltage of the electricity so as to output an AC output to the PDU 97 through the corresponding one of the transmission lines 10, 20.

The generators 93, 94 are, for example, diesel generators. Each of the generators 93, 94 is configured to detect voltage value of the AC output from the respective one of the AC transformers 91, 92. When it is detected that the AC output from the respective one of the AC transformers 91, 92 is abnormal (for example, the voltage value is lower than a predetermined value), the generator 93, 94 operates to provide AC electricity to the PDU 97 through the corresponding one of the first and second transmission lines 10, 20.

Each of the UPS's 95, 96 includes an AC-to-DC converter, a power storage module, a DC-to-AC converter and a control unit. The control unit of each UPS 95, 96 is configured to detect voltage value at the corresponding one of the first and second transmission lines 10, 20. The control unit controls the AC-to-DC converter to convert the electric power, which is received from the corresponding one of the first and second transmission lines 10, 20, into DC power, and to store electric energy of the DC power in the power storage module when the voltage value is within a normal range. The control unit controls the DC-to-AC converter to release the energy stored in the power storage module to the corresponding one of the first and second transmission lines 10, 20 when the voltage value is lower than a predetermined voltage value.

Since each of the UPS's 95, 96 includes the AC-to-DC converter and the DC-to-AC converter, the volume of each of the UPS's 95, 96 is relatively large, making installation difficult. In addition, since electric power conversion (ACto-DC or DC-to-AC) is required both in storing electric energy into the power storage module and in releasing electric energy from the power storage module, efficiency of the energy transformation is relatively low.

SUMMARY

Therefore, an object of the disclosure is to provide a direct current (DC) backup system that can alleviate at least one of the drawbacks of the prior art.

According to the disclosure, the DC backup system for providing emergency electric power to an electronic device powered by an input power source includes a battery backup unit and a battery control unit. The battery backup unit is configured to be coupled to the electronic device and is operable to output state information indicating a state thereof, and test information associated with a self test performed thereon. The battery control unit is electrically connected to the battery backup unit for receiving the state information and the test information therefrom, and is configured to control, according to the state information and the test information, the battery backup unit to output electric power to the electronic device when the input power source fails. Arrangement of the battery control unit is one of the following: integrated with the battery backup unit; and separated from the battery backup unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
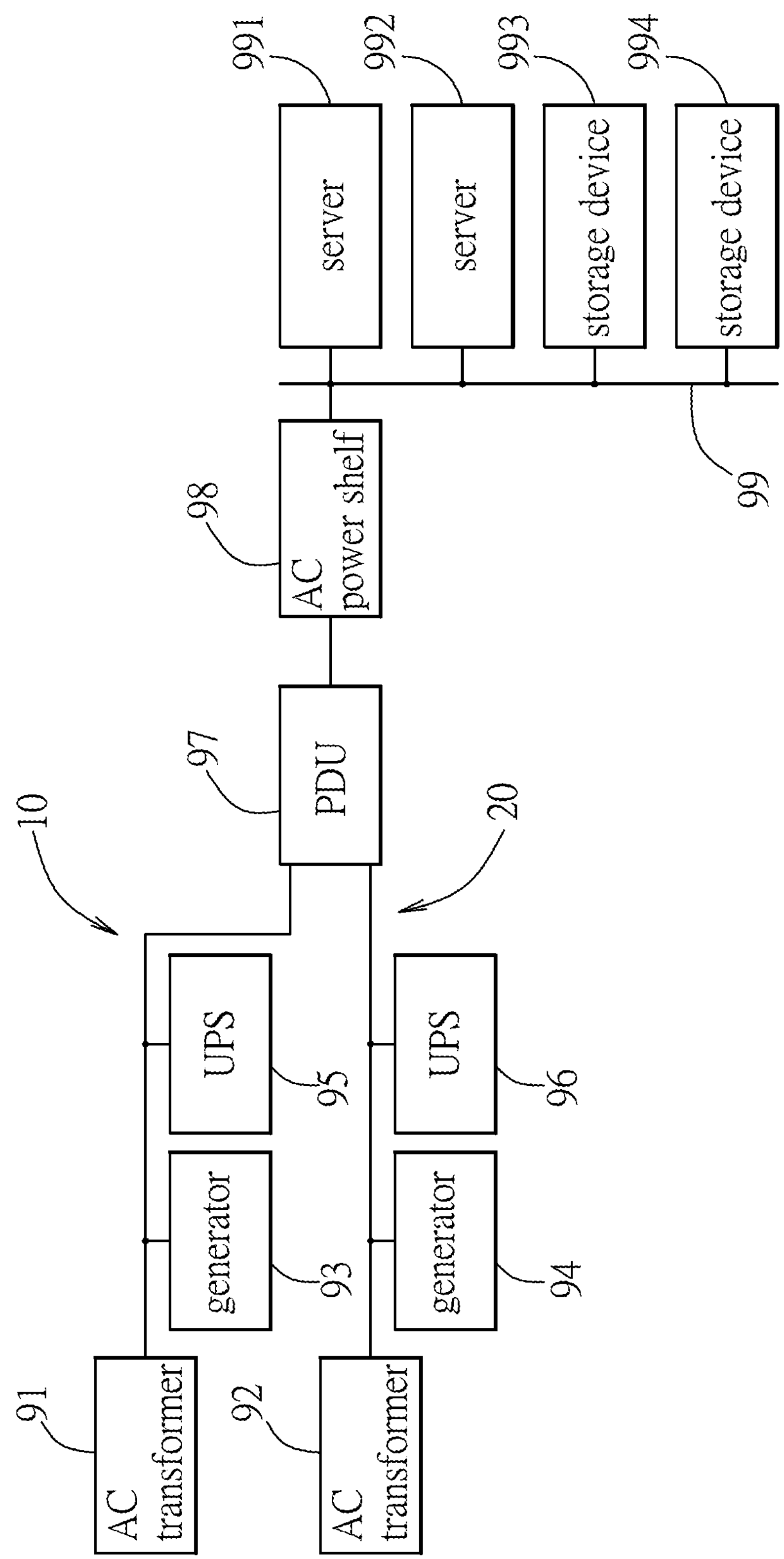
FIG. 1 is a block diagram of a conventional electricity architecture.
Figure 2:
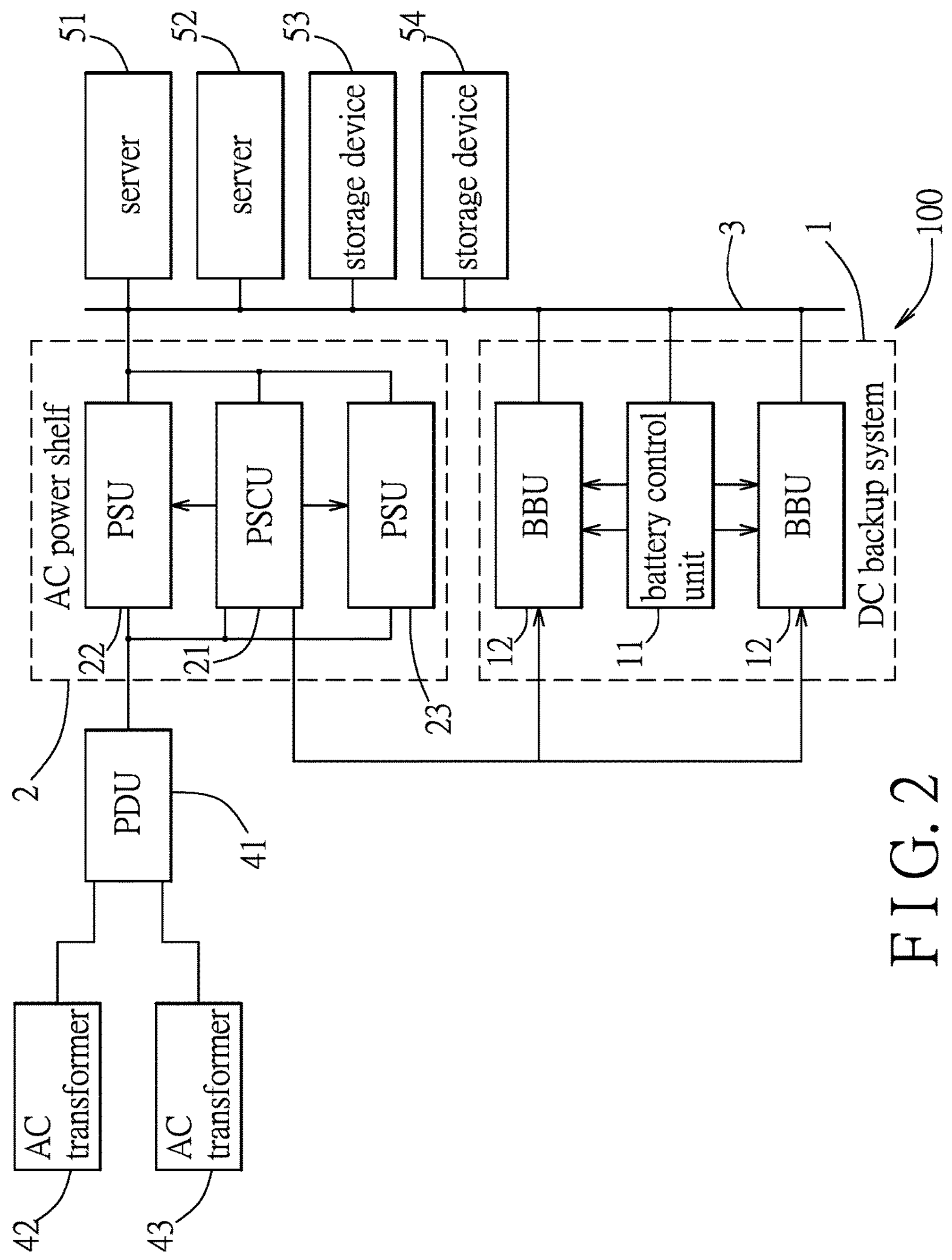
FIG. 2 is a block diagram illustrating an embodiment of a DC backup system used in an electricity architecture according to this disclosure.

Referring to FIG. 2, an embodiment of a direct current (DC) backup system 100 according to this disclosure is used in an electricity architecture that includes an alternating current (AC) power shelf 2, a bus 3, a plurality of electronic devices (for example, servers 51, 52 and storage devices 53,54), a power distribution unit (PDU) 41, and at least one AC transformer (for example, two AC transformers 42, 43). The DC backup system 100 of this embodiment is electrically connected to the AC power shelf 2, and to the electronic devices through the bus 3. The AC power shelf 2 is electrically connected to the PDU 41. The PDU 41 is electrically connected to the AC transformers 42, 43, and is configured to distribute AC electricity from at least one of the AC transformers 42, 43 to the AC power shelf 2.

The AC power shelf 2 is further electrically connected to the bus 3, and includes at least one power supply unit (PSU) (for example, two PSUs 22, 23), and a power supply control unit (PSCU) 21. The PSCU 21 is electrically connected to the PDU 41, the bus 3 and the PSUs 22, 23. The PSCU 21 is configured to control at least one of the PSUs 22, 23 to convert the AC electricity received from the PDU 41 into DC electricity and to transmit the DC electricity to the bus 3. In particular, each of the PSUs 22, 23 is configured to output the DC electricity having a desired voltage value, such that a voltage value at the bus 3 is substantially equal to the desired voltage value. For example, the desired voltage value is, but not limited to, 12.5 V. It should be noted that the voltage value at the bus 3 slightly varies at different positions since the impedance of the bus 3 may not equal zero. Thus, the voltage value of the bus 3 is substantially, but not exactly, equal to the desired voltage value.

In this embodiment, the electronic devices are powered by an input power source, and include the servers 51, 52 and the storage devices 53, 54. It should be noted that the number and types of the electronic devices are not limited to the disclosure of this embodiment. The servers 51, 52 and the storage devices 53, 54 are electrically connected to the bus 3 for receiving the DC electricity from the bus 3, and operate using the DC electricity. In such case, the PDU 41, the AC transformers 42 and 43, the AC power shelf 2 and the bus 3 constitute the input power source for powering the electronic devices.

The DC backup system 100 includes a number K of battery backup apparatus(es) 1, where K is a positive integer. Each battery backup apparatus 1 includes a number N of battery backup unit(s) (BBU) 12 electrically connected to the bus 3, and a battery control unit 11 electrically connected to the bus 3, where N is a positive integer. In one embodiment shown in FIG. 2, the DC backup system 100 includes one battery backup apparatus 1 (i.e., K=1), and the battery backup apparatus 1 includes two BBUs 12 (i.e., N=2).

The battery control unit 11 is integrated with one of the BBUs 12, or is separated from the BBUs 12. Each of the BBUs 12 is electrically connected to the battery control unit 11, and is configured to transmit state information and test information to the battery control unit 11. The battery control unit 11 is configured to control at least one of the BBUs 12 to supply electric power to the electronic devices based on the state information and the test information from the BBUs 12 when the input power source fails.

Figure 3:
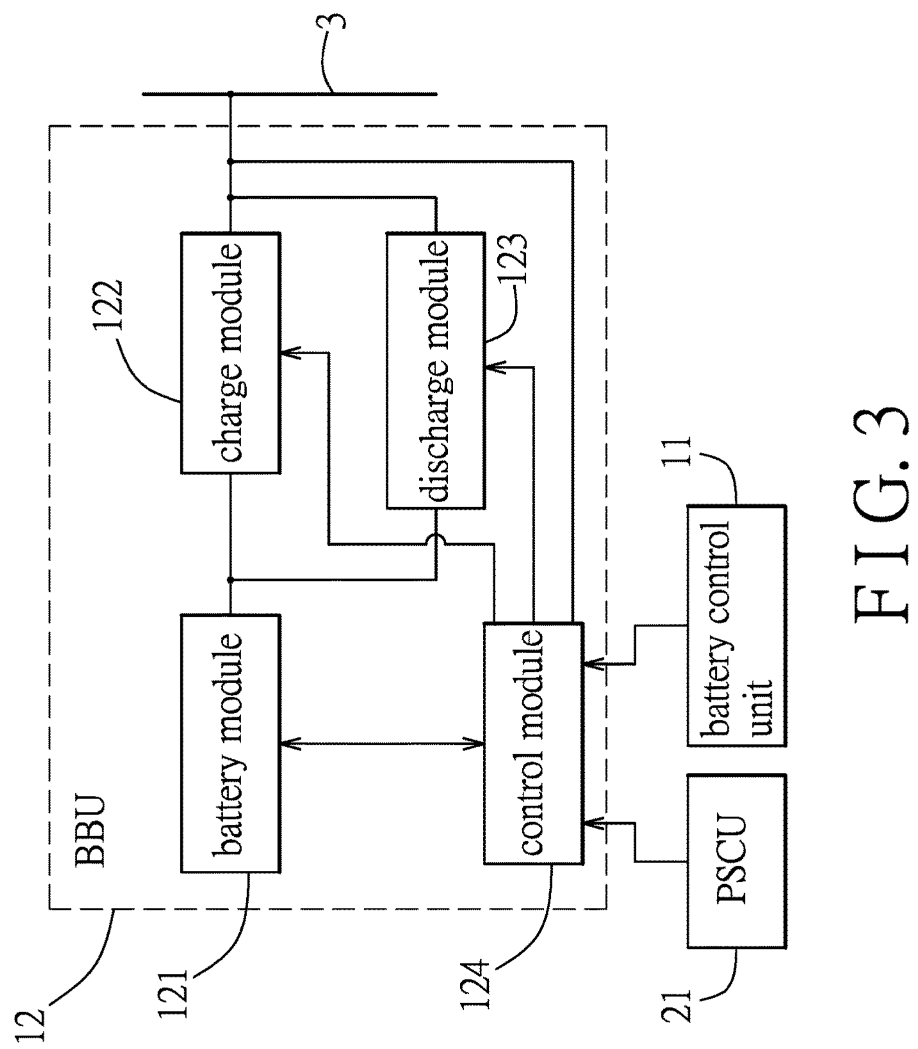
FIG. 3 is block diagram of an embodiment of a battery backup unit according to this disclosure.

Referring to FIG. 3, each of the BBUs 12 includes a battery module 121, a charge module 122, a discharge module 123 and a control module 124. The battery module 121 is configured to store the electric power, and has a plurality of rechargeable batteries connected in series, in parallel or in a series-parallel connection. For example, each of the rechargeable batteries is a lead-acid battery, a lithium-ion battery, etc. Each of the charge module 122 and the discharge module 123 is electrically connected between the bus 3 and the battery module 121. The control module 124 is electrically connected to the battery module 121, the charge module 122, the discharge module 123, the battery control unit 11 and the PSCU 21. For each of the BBUs 12, the test information is associated with a self test performed on the BBU 12, for example, the time when a self-discharge test is performed last on the BBU 12, and other information related to the self-discharge test. The state information indicates a state of the BBU 12, and for example, contains information about a number of the rechargeable batteries that conform with required specifications, a number of the rechargeable batteries that do not conform with the required specifications, whether any one of the rechargeable batteries is out of order, etc.

Referring to FIGS. 2 and 3, in operation, the PSCU 21 measures the voltage value at the bus 3, generates a number M1 of first discharge signal(s) associated with a discharge mode when the voltage value at the bus 3 is smaller than a first threshold value, and generates a number N of first charge signal(s) associated with a charge mode when the voltage value at the bus 3 is within a first predetermined voltage range, where M1 is an integer not greater than N. In one embodiment, the first threshold value is smaller than the desired voltage value, and is, for example, 12.25 V. The first predetermined voltage range contains the desired voltage value, and is, for example, a range from 11.64 V to 12.725 V. It should be noted that the first threshold value and the first predetermined voltage range are not limited to the disclosure herein. In other embodiments, the PSCU 21 may be configured to detect the AC electricity from the PDU 41, and to generate a number M1 of the first discharge signal(s) when the AC electricity is in an abnormal condition, for example, the AC electricity experiences a voltage drop or loss of phase, and there is an unbalanced three-phase load.

In other embodiments, the first discharge and charge signals may be generated by an upper-level apparatus, or the PSCU 21 and the upper-level apparatus both generate the first discharge and charge signals. For example, the upper-level apparatus is a management apparatus or server for monitoring and managing the power shelf 2.

The battery control unit 11 of the battery backup apparatus 1 also detects the voltage value at the bus 3, and determines whether the voltage value is within a first predetermined active range. When the voltage value is within the first predetermined active range, the battery control unit 11 transmits an active signal to the control module 124 of at least one of the BBUs 12. In particular, the battery control unit 11 generates a number M2 of the active signal(s), and transmits the active signal(s) respectively to a number M2 of the control module(s) 124, where M2 is an integer not greater than N. The first predetermined active range contains the desired voltage value, and is, for example, a range from 12 V to 12.725 V. It should be noted that, in other embodiments, the battery control unit 11 may generate only one active signal and transmit the only one active signal to each of the number M2 of the control module(s) 124.

The battery control unit 11 further determines whether the voltage value at the bus 3 is smaller than a second threshold value or within a second predetermined voltage range. When the voltage value at the bus 3 is smaller than the second threshold value (i.e., the input power source fails), the battery control unit 11 generates a number M3 of second discharge signal(s) associated with the discharge mode, where M3 is an integer not greater than N. When the voltage value at the bus 3 is within the second predetermined voltage range, the battery control unit 11 generates a number N of second charge signal(s) associated with the charge mode. In one embodiment, the second threshold value is smaller than the desired voltage value, and is, for example, 12.25V. The second predetermined voltage range contains the desired voltage value, and is, for example, a range from 11.64 V to 12.725 V. It should be noted that the second threshold value and the second predetermined voltage range are not limited to the disclosure herein.

The control module 124 of each of the BBUs 12 is configured to receive a corresponding one of the first charge signals and a corresponding one of the first discharge signals from the PSCU 21, and a corresponding one of the second charge signals and a corresponding one of the second discharge signals from the battery control unit 11. Each of the control modules 124 also detects the voltage value at the bus 3, and determines whether the voltage value is within a second predetermined active range. When the control module 124 of one of the BBUs 12 receives the active signal from the battery control unit 11 and determines that the voltage value at the bus 3 is within the second predetermined active range, the control module 124 operates in an active state to activate the battery module 121, the charge module 122 and the discharge module 123 of the corresponding BBU 12. The second predetermined active range contains the desired voltage value, and is, for example, a range from 12 V to 12.725 V.

When the control module 124 operates in the active state, the BBU 12 operates in one of the charge mode and the discharge mode according to receipt, by the control module 124, of one of the first charge signal, the first discharge signal, the second charge signal and the second discharge signal. The BBU 112 outputs the electric power to the electronic devices through the bus 3 in the discharge mode, and receives electricity from the input power source through the bus 3 and is charged by the electricity in the charge mode.

When the control module 124 receives one of the first charge signal from the PSCU 21 and the second charge signal from the battery control unit 11, the BBU 12 operates in the charge mode, and the control module 124 controls the charge module 122 to charge the battery module 121 with the electricity from the bus 3. When the control module 124 receives one of the first discharge signal from the PSCU 21 and the second discharge signal from the battery control unit 11, the BBU 12 operates in the discharge mode, and the control module 124 controls the discharge module 123 to discharge the electric power stored in the battery module 121 to the electronic devices through the bus 3, making the voltage value at the bus 3 substantially equal a predetermined voltage value. In one embodiment, the predetermined voltage value is approximately equal to the desired voltage value, and is, for example, 12.6 V. In another embodiment, the predetermined voltage value is exactly equal to the desired voltage value.

In one embodiment, the first charge and discharge signals from the PSCU 21 have a higher priority than the second charge and discharge signals from the battery control unit 11. That is to say, the control module 124 controls one of the charge module 122 and the discharge module 123 priorly according to receipt of one of the first charge and discharge signals from the PSCU 21 when the PSCU 21 is functional. When the PSCU 21 is abnormal, the control module 124 controls one of the charge module 122 and the discharge module 123 according to a receipt of one of the second charge and discharge signals from the battery control unit 11 instead.

In another embodiment where both the upper-level apparatus and the PSCU 21 generate the first discharge and charge signals, the upper-level apparatus has a higher priority than the PSCU 21, and the PSCU 21 has a higher priority than the battery control unit 11. When the upper-level apparatus is functional, the control module 124 controls one of the charge module 122 and the discharge module 123 priorly according to receipt of one of the first charge and discharge signals from the upper-level apparatus. When the upper-level apparatus is abnormal, the control module 124 controls one of the charge module 122 and the discharge module 123 according to receipt of one of the first charge and discharge signals from the PSCU 21. When both the upper-level apparatus and the PSCU 21 are abnormal, the control module 124 controls one of the charge module 122 and the discharge module 123 according to receipt of one of the second charge and discharge signals from the battery control unit 11 instead. Moreover, the battery control unit 11, the PSCU 21 and the upper-level apparatus are connected to one another by a serial communication bus. For example, the serial communication bus is an inter-integrated circuit (I2C) bus. The battery control unit 11 is configured to send a check signal with a fixed frequency to the PSCU 21 and the upper-level apparatus through the serial communication bus. Normally, each of the PSCU 21 and the upper-level apparatus sends a response signal to the battery control unit 11 in response to receipt of the check signal. When the response signal sent by one of the upper-level apparatus and the PSCU 21 is not received, the battery control unit 11 determines that said one of the upper-level apparatus and the PSCU 21 is abnormal.

Moreover, in the situation where N>1, i.e., there are multiple BBUs 12, when one of the BBUs 12 operates in the discharge mode (hereinafter also referred to as a discharging one of the BBUs 12), the battery control unit 11 is configured to control at least another one of the BBUs 12 to operate in the discharge mode for uninterruptibly providing the electric power to the electronic devices if the discharging one of the BBUs 12 is removed, being replaced or has failed.

The battery control unit 11 is further configured to store the state information and the test information of each of the BBUs 12. In one embodiment, the DC backup system 100 includes a plurality of the battery backup apparatuses 1 (i.e., K>1) that are electrically connected to each other or to a bus for data communication thereamong. When a number k of the battery backup apparatuses 1 are activated, one of the activated battery backup apparatuses 1 serves as a master apparatus, and remaining (k−1) one(s) of the activated battery backup apparatuses 1 serve respectively as slave apparatus(es), where k is an integer greater than 1 and equal to or smaller than K. The battery control unit 11 of the master apparatus obtains the state information and the test information stored in the battery control unit(s) 11 of the slave apparatus(es), and controls the BBU(s) 12 of the slave apparatus(es) to operate in one of the discharge mode and the charge mode according to the state information and the test information obtained from the battery control unit(s) 11 of the slave apparatus(es). In other words, the battery control unit 11 of the master apparatus detects and collects the state information and the test information of the BBUs 12 of all the battery backup apparatuses 1, and all the battery backup apparatuses 1 can cooperate to decrease the loading of the battery control unit(s) 11 of the slave apparatus(es).

In this embodiment, the PSUs 22 and 23 of the AC power shelf 2 are AC-to-DC converters. In other embodiments, the PSUs 22 and 23 are DC-to-DC converters.

In other embodiment, the PSCU 21 can be replaced with another controller similar to the PSCU 21 in terms of electrical connections and operations, but disposed at the upper-level apparatus.

In sum, compared with the UPS in the conventional electricity architecture, the battery backup apparatus 1 of this disclosure has a relatively small volume, is easy to be installed, and has a relatively great efficiency of energy transformation. Further, when the PSCU 21 of the AC power shelf 2 fails, or even when the AC power shelf 2 is omitted, the battery control unit 11 is still operable to control the BBUs 12 to operate in one of the charge and discharge modes, increasing stability and reliability of the electricity architecture of or similar to FIG. 2.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A direct current (DC) backup system for providing emergency electric power to an electronic device powered by an input power source, said DC backup system comprising a battery backup apparatus that includes:

a battery backup unit configured to be electrically connected to the electronic device through a direct current (DC) bus conducting input power from the input power source to the electronic device, said battery backup unit operable to output state information indicating a state thereof, and test information associated with a self test performed thereon, wherein said battery backup unit is operable in one of a discharge mode for outputting electric power to the electronic device through the DC bus, and a charge mode for receiving electricity from the input power source through the DC bus and being charged by the electricity; and a battery control unit electrically connected to said battery backup unit and the DC bus, said battery control unit configured to receive the state information and the test information from said battery backup unit, and to control, according to the state information and the test information, said battery backup unit to output electric power to the electronic device when the input power source fails, wherein said battery control unit detects a voltage value at the DC bus and controls said battery backup unit to operate in one of the discharge mode and the charge mode selected according to the voltage value at the DC bus, and wherein arrangement of said battery control unit is one of the following: integrated with said battery backup unit; and separated from said battery backup unit.

2. The DC backup system as claimed in claim 1, wherein said battery control unit is configured to:

determine whether the voltage value is smaller than a threshold value or within a predetermined voltage range, control said battery backup unit to operate in the discharge mode when the voltage value at the DC bus is smaller than the threshold value, and control said battery backup unit to operate in the charge mode when the voltage value is within the predetermined voltage range.

3. The DC backup system as claimed in claim 2, wherein said battery backup apparatus includes a plurality of the battery backup units, and said battery control unit controls at least one of said battery backup units to operate in the discharge mode when the voltage value at the DC bus is smaller than the threshold value, and controls all of said battery backup units to operate in the charge mode when the voltage value at the DC bus is within the predetermined voltage range.

4. The DC backup system as claimed in claim 3, wherein, when one of said battery backup units that operates in the discharge mode is removed, is being replaced or has failed, said battery control unit is configured to control at least another one of said battery backup units to operate in the discharge mode.

5. The DC backup system as claimed in claim 1, an alternating current (AC) power shelf being electrically connected to the electronic device through the DC bus, detecting the voltage value at the DC bus, and determining whether the voltage value is smaller than a threshold value or within a predetermined voltage range, wherein said battery backup unit is configured to be electrically connected to the AC power shelf, is configured to be controlled by the AC power shelf to operate in the discharge mode when the voltage value is smaller than the threshold value, and to operate in the charge mode when the voltage value is within the predetermined voltage range.

6. The DC backup system as claimed in claim 5, wherein said battery backup unit includes:

a battery module for storing the electric power;

a charge module electrically connected to said battery module, and configured to be electrically connected to the DC bus and to charge said battery module using the electricity received from the input power source through the DC bus in the charge mode of said battery backup unit;

a discharge module electrically connected to said battery module, and configured to be electrically connected to the DC bus and to discharge the electric power stored in said battery module to the DC bus in the discharge mode of said battery backup unit; and a control module electrically connected to said charge module, said discharge module and said battery control unit, and configured to be electrically connected to the AC power shelf and to be controlled by one of said battery control unit and the AC power shelf to control said charge module to charge said battery module and control said discharge module to discharge the electric power stored in said battery module.

7. The DC backup system as claimed in claim 6, wherein said control module is configured to determine whether to accept the control by said battery control unit and the AC power shelf according to a predetermined order of priority.

8. The DC backup system as claimed in claim 6, wherein said battery control unit is configured to further determine whether the voltage value at the DC bus is within a first predetermined active range, and to transmit an active signal to said control module of said battery backup unit when the voltage value is within the first predetermined active range, wherein said control module is configured to be electrically connected to the DC bus for detecting the voltage value at the DC bus, to determine whether the voltage value is within a second predetermined active range, and to activate said battery module, said charge module and said discharge module when the voltage value is within the second predetermined active range and the active signal is received such that said battery backup unit operates in one of the discharge mode and the charge mode.

9. The DC backup system as claimed in claim 1, wherein said battery control unit of said battery backup apparatus is further configured to store the state information and the test information received from said battery backup unit.

10. The DC backup system as claimed in claim 9, comprising a plurality of said battery backup apparatuses, said battery backup apparatuses being electrically connected to each other, wherein, when at least two of said battery backup apparatuses are activated, one of the at least two of said battery backup apparatuses serves as a master apparatus, and another one of the at least two of said battery backup apparatuses serves as a slave apparatus, wherein said battery control unit of said master apparatus obtains the state information and the test information stored in said battery control unit of said slave apparatus, and controls said battery backup unit of said slave apparatus to operate in one of the discharge mode and the charge mode according to the state information and the test information obtained from said battery control unit of said slave apparatus.

11. The DC backup system as claimed in claim 1, an alternating current (AC) power shelf detecting the input power source and generating a control signal when the input power source fails, wherein said battery backup unit is configured to be electrically connected to the AC power shelf, and to be controlled by the AC power shelf to output the electric power to the electronic device in response to receipt of the control signal from the AC power shelf.

12. A direct current (DC) backup system for providing emergency electric power to an electronic device powered by an input power source, said DC backup system comprising a battery backup apparatus that includes:

a battery backup unit configured to be electrically connected to the electronic device through a direct current (DC) bus, said battery backup unit operable to output state information indicating a state thereof, and test information associated with a self test performed thereon, wherein said battery backup unit is operable in one of a discharge mode for outputting electric power to the electronic device through the DC bus, and a charge mode for receiving electricity from the input power source through the DC bus and being charged by the electricity; and a battery control unit electrically connected to said battery backup unit and the DC bus, said battery control unit configured to receive the state information and the test information from said battery backup unit, and to control, according to the state information and the test information, said battery backup unit to output the electric power to the electronic device when the input power source fails, wherein said battery control unit is configured to be electrically connected to the DC bus for detecting a voltage value at the DC bus, and to control said battery backup unit to operate in one of the discharge mode and the charge mode selected according to the voltage value at the DC bus.

13. A direct current (DC) backup system for providing emergency electric power to an electronic device powered by an input power source, said DC backup system comprising a battery backup apparatus that includes:

a battery backup unit configured to be electrically connected to the electronic device through a direct current (DC) bus, wherein said battery backup unit is operable in one of a discharge mode for outputting electric power to the electronic device through the DC bus, and a charge mode for receiving electricity from the input power source through the DC bus and being charged by the electricity; and a battery control unit electrically connected to said battery backup unit and the DC bus, wherein said battery control unit detects a voltage value at the DC bus and controls said battery backup unit to operate in one of the discharge mode and the charge mode selected according to the voltage value at the DC bus.

14. The DC backup system as claimed in claim 13, wherein said battery control unit controls said battery backup unit to operate in the discharge mode when the voltage value at the DC bus is smaller than a threshold value, and controls said battery backup unit to operate in the charge mode when the voltage value at the DC bus is within a predetermined voltage range.

15. The DC backup system as claimed in claim 13, wherein said battery control unit of said battery backup apparatus is configured to store state information and test information received from said battery backup unit.

* * * * *